United States Patent [19]

Branson

[11] 4,060,192
[45] Nov. 29, 1977

[54] FUEL CONTROL SYSTEM AND METHOD OF OPERATING THE SAME AND DIVERTER VALVE THEREFOR

[75] Inventor: Charles D. Branson, Greensburg, Pa.

[73] Assignee: Robertshaw Controls Company, Richmond, Va.

[21] Appl. No.: 715,846

[22] Filed: Aug. 19, 1976

Related U.S. Application Data

[62] Division of Ser. No. 558,813, March 17, 1975, Pat. No. 3,989,188.

[51] Int. Cl.² .............................................. G05D 23/02
[52] U.S. Cl. ................................. 236/46 D; 137/861; 236/68 R; 236/102
[58] Field of Search ................. 236/15 A, 46 D, 68 R, 236/1 B, 101 A, 102; 137/624.11, 610; 62/196 B; 251/11

[56] References Cited

U.S. PATENT DOCUMENTS

| | | | |
|---|---|---|---|
| 2,492,445 | 12/1949 | Salinger | 236/102 |
| 2,691,870 | 10/1954 | Smith | 62/196 B |
| 2,751,152 | 6/1956 | Ellenberger | 236/68 B |
| 3,130,354 | 4/1964 | Burling | 236/68 B |

Primary Examiner—William E. Wayner
Attorney, Agent, or Firm—Candor, Candor & Tassone

[57] ABSTRACT

A fuel control system for a main burner having a dual rate pilot burner and a control device for providing a standby flame flow of fuel to the pilot burner when the output temperature effect of the main burner is above the temperature setting of the control device and for providing a large heater flame flow of fuel to the pilot burner when the output temperature effect of the main burner is below the temperature setting of the control device so that only the heater flame will cause a main flow of fuel to the main burner for a heating operation thereof. A diverter valve is provided for diverting the heater flame flow of fuel from the dual rate pilot burner to another pilot burner so that the main flow of fuel to the main burner will cease even though the output temperature effect of the main burner is below the temperature setting of the control device, the diverter valve being controlled by a timer or the like to provide a "cook and hold" feature of the system.

5 Claims, 3 Drawing Figures

FUEL CONTROL SYSTEM AND METHOD OF OPERATING THE SAME AND DIVERTER VALVE THEREFOR

This application is a divisional patent application of its copending parent patent application, Ser. No. 558,813, filed Mar. 17, 1975, now U.S. Pat. No. 3,989188.

This invention relates to an improved fuel control system for a main burner of a cooling apparatus or the like as well as to a method of operating such a fuel control system and to a diverter valve for such a fuel control system or the like.

It is well known that fuel controls systems have been provided for a main burner of a cooking apparatus or the like wherein a control device is provided for directing a standby flame flow of fuel to a dual rate pilot burner when the output temperature effect of the main burner is above the temperature setting of the control device and for directing a larger heater flame flow of fuel to the pilot burner when the output temperature effect of the main burner is below the temperature setting of the control device so that only the heater flame will cause a main flow of fuel to the main burner for a heating operation thereof. For example, see the U.S. patent to Branson, No. 3,809,313 for such a fuel control system.

It is a feature of this invention to provide means for automatically causing such a fuel control system to decrease the output temperature effect of the main burner even though the output temperature effect of the main burner is below the temperature setting of the control device. In particular, one embodiment of this invention provides means for diverting the heater flame flow of fuel from the dual rate pilot burner of the above described fuel control system to another pilot burner so that the main flow of fuel to the main burner will cease even though the output temperature effect of the main burner is below the temperature setting of the contol device. In this manner, the other pilot burner will tend to create a reduced output temperature effect in the oven containing the main burner and pilot burners for a warmth retaining and non-cooking temperature operation of the food in the oven that had been previously cooked by the normal cycling action of the main burner, the means for diverting the heater flame flow of fuel being adapted to be timer operated in a manner hereinafter described in order to provide a "cook and hold" feature for the system.

Accordingly, it is an object of this invention to provide an improved fuel control system having one or more of the novel features set forth above or hereinafter shown or described.

Another object of this invention is to provide an improved method of operating such fuel control system or the like.

Another object of this invention is to provide an improved diverter valves construction for such a fuel control system or the like.

Other objects, uses and advantages of this invention are apparent from a reading of this description which proceeds with reference to the accompanying drawings forming a part thereof and wherein.

Figure 1:
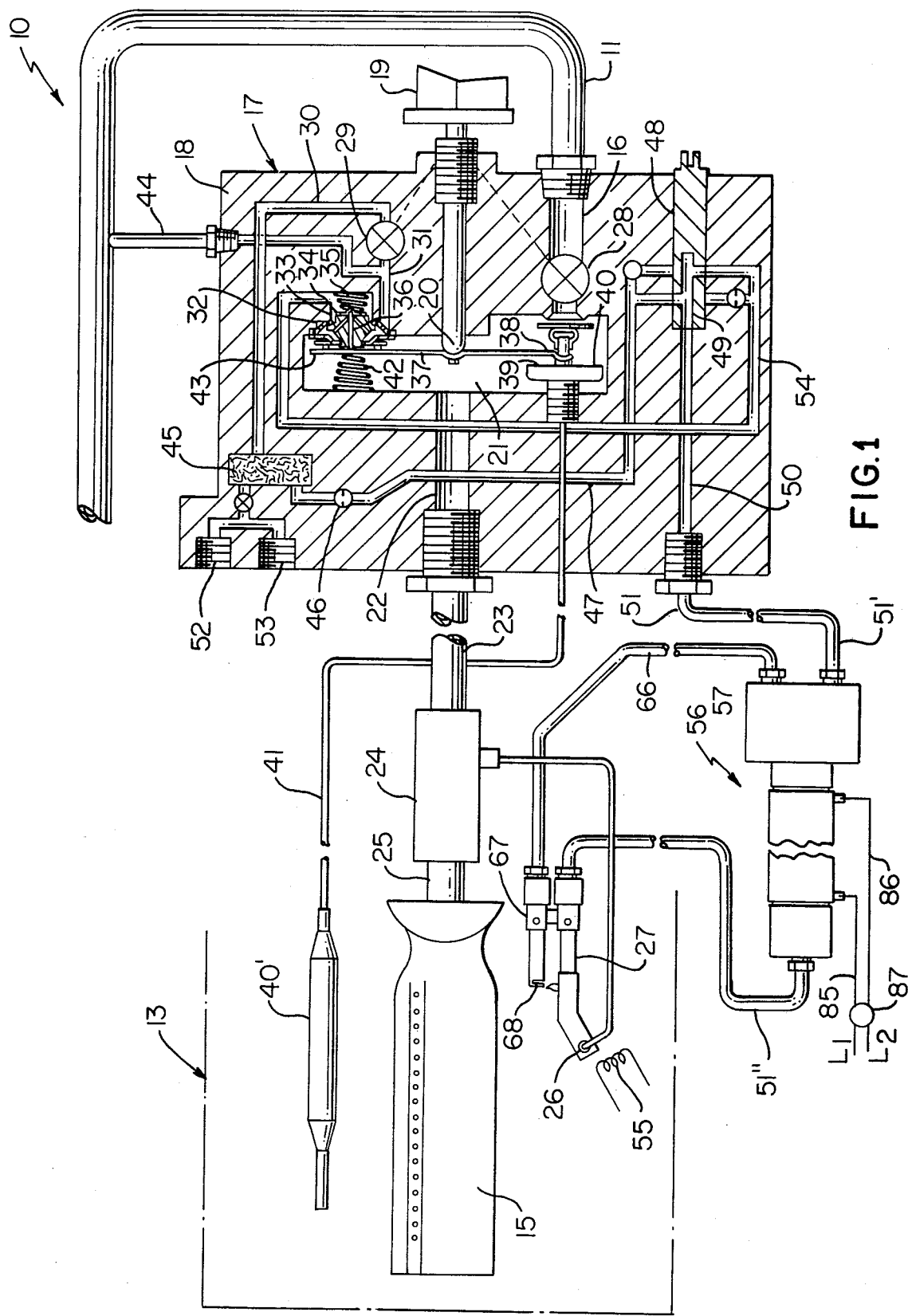
FIG. 1 is a schematic view illustrating the improved fuel control system of this invention.

While the various features of this invention are hereinafter described and illustrated as being particularly adapted to provide a fuel control system for a cooking apparatus, it is to be understood that the various features of this invention can be utilized singly or in any combination thereof to provide a fuel control system for other apparatus as desired.

Therefore, this invention is not to be limited to only the embodiment illustrated in the drawings, because the drawings are merely utilized to illustrate one of the wide variety of uses of this invention.

Referring now to FIG. 1, the improved fuel control system of this invention is generally indicated by the reference numeral 10 and comprises a fuel source conduit or manifold 11 of a cooking apparatus that is indicated by dashed lines in the drawings and is generally indicated by the reference numeral 13.

The cooking apparatus 13 has one or more main burner means, such as the main burner means 15 illustrated in the drawing as being disposed in the oven of the cooking apparatus 13 and being utilized to control both a baking and broiling operation thereof in a manner well known in the art. For example, see the U.S. Pat. to Tyler, No. 3,341,119, which fully discloses a fuel control system for a single burner means to provide both the baking and broiling operation thereof.

Therefore, it is deemed necessary to only describe sufficient details of the cooking apparatus 13 and the control means therefore for a full understanding of this invention as further details of the structure and operation of the fuel control system 10 can be readily obtained by referring to the aforementioned U.S. Pat. to Tyler.

As illustrated in FIG. 1, the manifold or fuel source conduit 11 is interconnected to an inlet passage 16 of a control device 17 having a housing means 18 and temperature selector knob 19 therefor for controlling the axial position of a fulcrum pin 20 within a chamber 21 formed in the housing means 18 as the knob 19 is being positioned at a desired temperature setting thereof. The chamber 21 leads to an outlet 22 that is adapted to be interconnected to a conduit 23 that leads to a safety valve construction 24. The safety valve 24 is adapted to interconnect the conduit 23 with a conduit 25 for the main burner 15 when the valve means 24 is disposed in an open position thereof. It is well known that the safety valve means 24 is only adapted to be disposed in an open condition thereof when a flame sensing bulb 26 thereof senses that a large heater flame is existing at a dual rate pilot burner means 27 and not when only a continuously burning small standby flame exists at the pilot burner means 27, dual rate pilot burner means having an opening 12 for issuing the small standby flame and a larger opening 14 disposed spaced from the opening 12 for issuing the large heater flame that is detected by the flame sensing bulb 26 located at the opening 14.

The inlet 16 of the control device 17 is adapted to be interconnected to the chamber 21 thereof by a disc valve member 28 that is moved to an open position thereof by the selector knob 19 being turned to any "on" position thereof, the control knob 19 also controlling another portion 29 of the disc valve 28 to interconnect a branch conduit 30 of the housing means 18 with another passage 31 thereof when the control knob is turned to any "on" position thereof.

The passage 31 is interconnected to a chamber 32 of the housing 18 that is adapted to be interconnected to another chamber 33 thereof when a valve member 34 is moved to its open position thereof in position to the force of a compression spring 35 under the action of an axially movable plunger 36 that is adapted to be moved to the right in FIG. 1 to open the valve member 34 when a lever 37 fulcrumed on the pin 20 is caused to pivot in a clockwise direction on the fulcrum pin 20 as hereinafter described whereby the chamber 32 will be interconnected to the chamber 33 for a purpose hereinafter described.

The lever 37 that is fulcrumed on the fulcrum pin 20 has an end 38 thereof bearing against a movable wall 39 or an expandable wall 39 of an expandable and contractible power element 40 that has the fluid thereof expanded and contracted by the temperature adjacent a temperature sensing bulb 40' interconnected to the power element by a capillary tube 41. The bulb 40' senses the output temperature effect of the burner means 15 in the oven of the cooking apparatus 13 so that when the temperature in the oven of the cooking apparatus 13 exceeds the temperature setting of the selector knob 19 during a cooking operation of the apparatus 13, the fluid in the power element 40 has expanded in such a manner that the movable wall 39 moves to the right in FIG. 1 a sufficient distance to permit the valve member 34 to close the chamber 32 from the chamber 33. Conversely, when the temperature in the oven falls below the temperature selected by the selector knob 19, the fluid in the power element 40 has contracted to such a condition that a compression spring 42 acting on the upper end 43 of the lever 37 causes the same to pivot in a clockwise direction in FIG. 1 a sufficient distance to open the valve member 34 and, thus, interconnect the chamber 32 with the chamber 33 for a purpose hereinafter described.

The manifold or fuel source conduit 11 is interconnected by a conduit 44 to the branch passage 31 formed in the housing 18 of the control device 17.

The branch passage 30 of the housing 18 of the control device 17 while leading to the valve portion 29 of the disc valve 28 also leads through a filter chamber 45 to a restrictor 46 that interconnects the main passage 30 with a passage 47 that leads to a pilot selector key 48. The key 48 has a passage 49 therein that is interconnected to a branch passage 50 formed in the housing 18 and leads to a conduit 51 for the pilot burner 27 as will be apparent hereinafter.

The restrictor 46 and the control device 17 is so constructed and arranged that the same is adapted to pass only a sufficient amount of fuel from the passage 31, through the opened valve portion 29 and passage 30, to the passage 47, and, thus, through the selector key 48 to the pilot burner 27 to produce a small standby flame at the pilot burner 27 which is insufficient to cause the detector 26 to cause the main valve means 24 to move to an open condition thereof.

Thus, it can be seen that when the valve portion 29 of the valve disc 28 is disposed in an open position connecting the passage 30 with the passage 31, the fuel supply conduit 11 is adapted to pass sufficient fuel through the restrictor 46 from the conduit 44 to continuously supply sufficient fuel to the pilot burner 27 to produce a standby flame at the pilot burner 27.

Thus, it can be seen that even though the valve member 34 is disposed in its closed position and the portion 29 of the disc valve 28 is disposed in an "on" position connecting the passage 30 with the passage 31, sufficient fuel is supplied by the conduit 44 to the passage 30 so that the restrictor 46 will supply sufficient fuel to the pilot burner 27 to maintain a small standby flame as the pilot burner 27 will be continuously operating as long as the control device 17 is in an "on" condition thereof. Such small standby flame at the pilot burner 27 will not effect the detector and, thus, the main valve means 24 will be disposed in a closed position thereof as long as only the small standby flame is burning at the pilot burner 27 in the manner previously described.

The filter chamber 45 of the control device 17 is adapted to be interconnected to pilot burner outlets 52 and 53 that can lead to other pilot burner means of the cooking apparatus 13 as desired, such as pilot burner means for the burner means at the cooking top of the apparatus 13 as is well known in the art.

The chamber 33 of the control device 17 is interconnected by a branch passage 54 in the housing means 18 to the passage 49 of the pilot selector key 48 so that when the valve member 34 is moved to an open condition thereof to interconnect the chamber 32 with the chamber 33, it can be seen that additional fuel from the conduit 44 of the fuel source conduit 11 is now being fed through the selector key 48 to the conduit 51 that is adapted to lead to the pilot burner means 27.

This additional amount of fuel adapted to be supplied to the pilot burner means 27 when the valve member 34 is moved to an open position thereof will cause the standby flame at the pilot burner means 27 to increase in size and form the aforementioned large heater flame at the outlet 14 which is adapted to be detected by the detector 26 so that the main valve means 24 moves to an open condition to thereby interconnect the conduit 23 with the conduit 25 as long as the large heater flame exists at the pilot burner means 27. Since the disc valve 28 is in an open position thereof when the selector knob 19 is set to an "on" position thereof, fuel flows from the inlet 16 through the chamber 21 and outlet 22 of the control device 17, the now opened valve means 24 and to the main burner means 15 to issue therefrom and be ignited by the pilot burner means 27 whereby the main burner means 15 will be burning fuel as long as the valve means 24 remains in an open condition.

Thus, during a normal cooking operation of the system 10, when the bulb 40' detects that the temperature in the oven of the cooking apparatus 13 is at or is slightly above the selected temperature setting of the control knob 19, the power element 40 has moved the lever 37 in such a manner that the valve member 34 moves to its closed position to disconnect the chamber 32 from the chamber 33 so that the additional amount of fuel formerly being supplied to the pilot burner means 27 through the branch passage 54 is terminated and the pilot burner means 27 therefor has its flame reduced to the aforementioned small standby flame at the outlet 12 whereby the valve means 24 moves to its closed position to disconnect the flow of fuel to the main burner 15.

Conversely, when the temperature in the oven 13 falls below the temperature setting of the selector knob 19, the power element 40 causes the lever 37 to move in its clockwise direction to open the valve member 34 so that the additional amount of fuel is not directed to the pilot burner means 27 to cause the large heater flame to exist and be detected by the detector bulb 26 so that the main valve means 24 moves to an open position. Thus, fuel can now issue from the main burner 15 and tend to heat up the oven for the cooking apparatus 13 to the selected temperature thereof.

Therefore, it can be seen that the control device 17 when set for a normal cooking operation, opens the valve portions 28 and 29 and causes the burner 15 to cycle on and off to tend to maintain the temperature in the oven at the temperature setting of the selector knob 19 as the valve member 34 will be cycled between its open and closed positions to cause a heater flame to exist and not exist at the pilot burner means 27 to control the operation of the valve means 24 and, thus, the operation of the main burner 15 in the manner previously described.

In order to initially ignite the pilot burner means 27 when the control knob 19 is turned to an initial "on" position thereof for a normal cooking operation, an electrically operated ignition coil 55 is energized by the knob 19 being initially turned to its "on" condition so that the fuel first issuing from the pilot burner means 27, by the disc portion 29 being turned to open the passage 30 to the passage 31, will be ignited by the energized ignition coil 55 with the ignition coil 55 thereafter being rendered inoperative as long as the control knob 19 remains in its "on" condition. Such operation of the ignition coil 55 is fully disclosed and claimed in applicant's copending patent application Ser. No. 445,258, filed Feb. 25, 1974, and full details of the structure and operation thereof can be obtained from such copending patent application. Therefore, since the ignition coil 55 and its operation does not form any of the features of this invention, further discussion thereof is not necessary as it will be understood that each time the control knob 19 is turned to its "on" condition, the ignition coil 55 will be energized to ignite the first flow of fuel from the pilot burner means 27 and thereafter be rendered inoperative as long as its control knob 19 remains in its "on" condition. However, each time the control knob 19 is turned to its "off" condition and subsequently is turned to its "on" condition for a new cooking operation, the ignition coil 55 will be initially and temporarily energized for igniting the pilot burner means 27.

As previously stated, one of the features of this invention is to provide means for automatically diverting the additional flow of fuel that is fed by the valve member 34 to the passage 54 of the control device 17 to produce the large heater flame at the pilot burner means 27 away from the pilot burner means 27 even though the control device 17 is set in its "on" condition and the output temperature effect of the burner means 15 in the cooking apparatus 13 as being detected by the bulb 40' is below the temperature setting of the control knob 19.

Such diverting means is provided by a diverter valve of this invention that is generally indicated by the reference numeral 56 and which is disposed in the conduit 51.

The diverter valve 56 includes a housing means 57 having an inlet 58 interconnected to the portion 51' of the conduit 51 intermediate the diverter valve 56 and the control device 17 and an outlet 59 interconnected to the portion 51" of the conduit 51 disposed intermediate the diverter valve 56 and the pilot burner 27.

The housing 57 has a pair of valve seats 60 and 61 disposed therein in spaced apart aligned relation with the inlet 58 being interconnected to the space between the valve seats 60 and 61 by a passage 62. The valve seat 61 leads to an internal passage 63 of the housing 57 that is interconnected with the outlet 59 whereas the valve seat 60 leads to a passage 64 that is interconnected to another outlet 65. The outlet 65 is interconnected by a conduit 66 to another pilot burner 67 having an outlet 68 disposed adjacent the outlet port 12 of the first pilot burner means 27 for a purpose hereinafter described.

A movable member 69 is disposed between the valve seats 60 and 61 and is normally urged toward the valve seat 61 by a compression spring 70 having one end 71 disposed against the valve member 69 and the other end 72 bearing against a housing wall 73 of the housing means 57.

The housing means 57 of the diverter valve 56 includes a rod and tube arrangement that is generally indicated by the reference numeral 74 and comprises a tube portion 75 and a rod 76. The rod 76 is disposed inside the tube 75 and has one end 77 effectively fixed to the tube 75 by an overrun compression spring 78 having one end 79 bearing against the housing 57 and the other end 80 bearing against a retainer 81 threaded on the end 77 of the rod 76 and normally bearing against an internal shoulder 82 of the tube 75. The other end 83 of the rod 76 is adapted to project through the valve seat 61 and abut against the valve member 69 for a purpose hereinafter described.

The rod 76 is formed of material having a relatively low coefficient of thermal expansion while the tube 75 is formed of material having a relatively high coefficient of thermal expansion as is well known in the art.

An electrical heating unit 84 is disposed about the tube 75 of the rod and tube arrangement 74 and has opposed leads 85 and 86 adapted to be interconnected to power source leads L1 and L2 by electrical switch means (not shown) of a timer or clock 87.

Figure 1A:
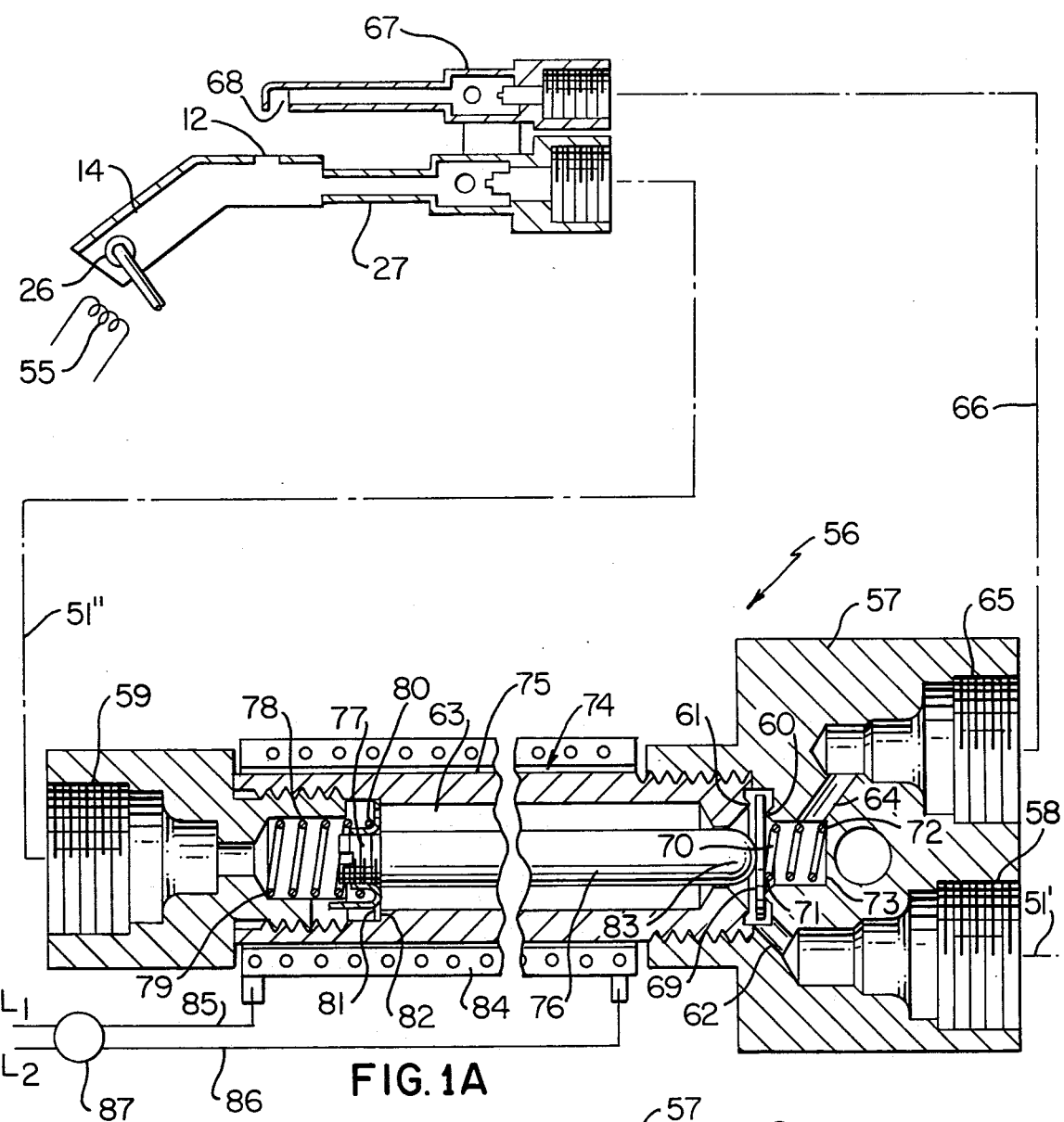
FIG. 1A is an enlarged fragmentary cross-sectional view of the diverter valve and pilot burners of FIG. 1.

In particular, when the electrical heater 84 is not operating, the normal ambient temperature surrounding the diverter valve 56 causes the rod and tube arrangement 74 to assume the condition illustrated in FIG. 1A wherein the end 83 of the rod 76 is holding the valve member 69 fully seated against the valve seat 60 in opposition to the force of the compression spring 70 as the effective length of the tube 75 of the rod and tube arrangement 74 is in its shortened condition, the spring 78 acting on the end 77 of the rod 76 permitting the tube 75 to further shorten its length even though the valve member 69 is seated against the valve seat 60. Thus, any fuel being passed to the conduit 51 by the control device 17 will flow through the conduit portion 51' into the inlet 58 thereof, passage 62, open valve seat 61, passage 63 and outlet 59 to the conduit portion 51" and, thus, to the pilot burner means 27 as illustrated in FIG. 1A.

Figure 2:
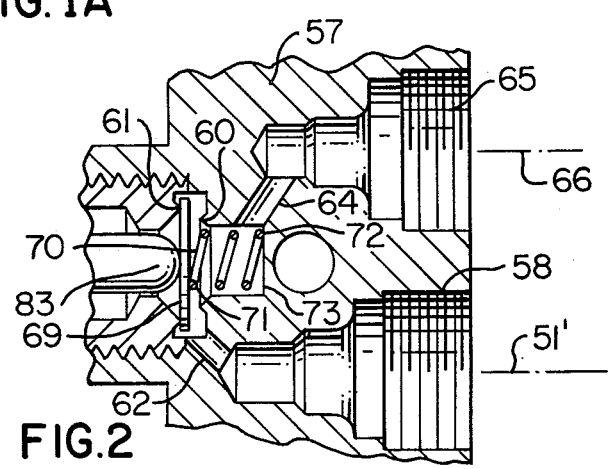
FIG. 2 is a view similar to FIG. 1 and illustrates the diverter valve after the same has changed from a normal cooking operation to a holding operation.

However, when the clock 87 interconnects the power source leads L1 and L2 to leads 85 and 86, the heater 84 is energized and causes the tube 75 of the rod and tube arrangement 74 to elongate whereby the end 83 of the rod 76 moves to the left and thereby permits the compression spring 70 to move the valve member 69 away from the valve seat 60 and to seat fully against the valve seat 61 in the manner illustrated in FIG. 2. Thus, any fuel being delivered into the conduit 51 by the control device 17 now passes from the inlet 58, passage 62 and opened valve seat 60 through the passage 64 to the outlet 65 and, thus, to the conduit 66 that leads to the pilot burner 67 for a purpose hereinafter described.

The clock 87 can be so constructed and arranged that when the same is in normally an "off" condition, the power source leads L1 and L2 are not interconnected to the leads 85 and 86. Also, when the operator sets the clock or timer 87 to a desired time period thereof, the clock 87 likewise does not interconnect the power source leads L1 and L2 to the leads 85 and 86 during the rundown of the timer clock 87 from the initial set time period thereof. However, when the selected time period of the clock or timer 87 lapses, the timer 87, through suitable switch means (not shown), interconnects the leads L1 and L2 to the leads 85 and 86 to operate the heater 84 in the above manner and maintains the heater 84 in its energized condition until the operator manually turns the timer or clock 87 to its "off" position or the clock 87 through automatic means automatically turns itself to its "off" condition after a lapse of another time period following the lapse of the set time period.

The operation of the control system 10 of this invention will now be described.

With the control knob 19 of the control device 17 disposed in its "off" condition, the disc valves 28 and 29 are disposed in the "off" positions thereof so that no fuel is directed to the passages 22 and 30 of the control device 17. Thus, no fuel is directed to the diverter valve 56 and safety valve 24.

However, when the operator of the system 10 desires to cook food in the oven of the apparatus 13 at a desired temperature for a desired time period, such as to bake a meat item at 350° for 2 hours, the operator sets the timer 87 to a two hour time period thereof and turns the control knob 19 to the selected temperature of 350° F.

As previously stated, the clock 87, when turned to a selected time period thereof, does not interconnect the power source leads L1 and L2 to the leads 85 and 86 whereby the diverter valve 56 remains in the condition illustrated in FIG. 1A wherein the valve member 69 is being held by the rod 76 against the valve seat 60 so that the valve seat 61 is fully open and thereby interconnects the conduit portion 51' with the conduit portion 51" that leads to the pilot burner means 27.

Upon the initial turning of the control knob 19 of the control device 17 to the "on" condition for the 350° F setting thereof, the ignition coil 55 is energized and the fuel that is now directed through the selector key 48 to the conduit portion 51' by the control device 17 having the valve portion 29 disposed to an "on" condition and having the valve member 34 moved to an open condition because the temperature of the oven is obviously below the selected 350° F temperature at this time, is directed by the divert valve 56 to the pilot burner 27 and is ignited by the ignitor 55 so that a large heater flame appears at the outlet 14 thereof. Such large heater flame is detected by the detector 26 which opens the safety valve 24.

The opening of the safety valve 24 permits fuel to flow from the control device 17 through the conduit 23 and opened safety valve 24 to conduit 25 and, thus, to the main burner means 15 to be ignited by the pilot burner means 27.

As the temperature of the oven of the cooking apparatus 13 heats up to the selected temperature of 350° F or slightly above the same through the above described operation of the main burner 15, the bulb 40' causes the pilot element 40 to close the valve member 34 so that the additional flow of fuel through the passage 54 to the pilot burner means 27 is terminated. Thus, the large heater flame no longer appears at the outlet 14 of the pilot burner means 27 and only the small standby flame is created at the outlet 12 of the pilot burner means 27 for the reasons previously set forth whereby the safety valve 24 closes and stops the flow of fuel to the main burner 15.

Thus, the main burner means 15 is cycled "on" and "off" in the manner previously described by the pilot burner means 27 creating its heater flame as the output temperature effect of the burner means 15 falls below the selected temperature and terminates its heater flame when the output temperature effect of the burner means 15 exceeds the selected temperature during the entire cooking operation of the system 10.

However, when the two hour period selected by the timer 87 lapses, the timer 87 interconnects the power source leads L1 and L2 to the leads 85 and 86 of the diverter valve 56 to cause the heater 84 to be energized and thereby elongate the tube 75 thereof so that the non-expanding rod 76 will permit the valve member 69 to be moved away from the valve seat 60 by the force of the compression spring 70 and close against the valve seat 61 in the manner illustrated in FIG. 2. In this manner, the entire flow of fuel through the conduit portion 51' is now diverted by the diverter valve 56 to the pilot burner 67 to issue out of the outlet 68 thereof. As the valve member 69 of the diverter valve 56 is being moved away from the seat 60 and before the same seats on the seat 61, it can be seen that the flow of fuel is divided between the outlets 59 and 65 so that the fuel now beginning to issue from the outlet 68 of the upper pilot burner 67 is ignited by the flame at the standby outlet 12 of the pilot burner 27 so that when the valve member 69 completely closes the valve seat 61, all flames of the pilot burner 27 cease to exist while a flame now exists at the outlet 68 of the pilot burner 67.

However, since the outlet 68 of the pilot burner 67 is disposed remote from the detector 26 of the safety valve 24, the safety valve 24 cannot be opened even though the output temperature effect in the oven of the cooking apparatus 13 falls below the selected temperature setting of the knob 19 so that the valve member 34 is moved to an open position creating the additional flow of fuel through the passage 54 to the conduit portion 51'.

In this manner, the oven of the cooking apparatus 13 begins to cool or coast down to a warmth retaining and non-cooking temperature, such as 170° F or whatever temperature is created by the now continuously burning pilot flame at the outlet 68 of the pilot burner means 67. Alternately, a separate sensor (not shown) can be utilized in the oven to control the "hold" temperature of the oven by cycling the electric heater 84 "on" and "off" to cause the main burner 15 to cycle "on" and "off" to maintain the warmth retaining and non-cooking temperature in the manner previously described.

In any event, after a predetermined time that the oven of the cooking apparatus 13 is being maintained at the "hold" temperature thereof, the clock 87 can automatically open the circuit from the power source leads L1 and L2 to the leads 85 and 86 to thereby terminate the complete operation of the diverter valve 56 so that the same will be reset for its normal operation. Alternatively, the timer 87 must be turned to its "off" position by the operator before the system 10 can be reset for another cooking operation thereof as the timer 87 will maintain the oven in its "hold" condition indefinitely.

Of course, the system 10 can be utilized solely for a cooking operation without utilizing the timer 87, if desired, by just merely permitting the timer 87 to remain in its "off" position during a cooking operation. In this manner, the timer 87 is only utilized when it is desired to have the temperature of the oven reduced to a warmth retaining and non-cooking temperature after the lapse of a predetermined cooking time period as set on the timer 87 in the manner previously described.

Therefore, it can be seen that this invention not only provides an improved fuel control system and method of operating the same, but also this invention provides an improved diverter valve arrangement for such a system or the like.

While the forms and methods of this invention now preferred have been described and illustrated as required by the Patent Statute, it is to be understood that other forms and method steps can be utilized and still come within the scope of the appended claims.

What is claimed is:

1. A diverter valve construction comprising a housing having a pair of valve seats and a movable valve member for respectively opening one of said valve seats while closing the other of said valve seats, said housing having an inlet leading between said pair of valve seats and having a pair of outlets respectively leading from said pair of valve seats, said housing carrying a rod and tube arrangement operatively associated with said valve member for moving said valve member relative to said seats upon temperature changes sensed by said rod and tube arrangement, said rod and tube arrangement having the tube thereof defining part of one of said outlets of said housing, an electrical heater operatively associated with said rod and tube arrangement for heating the same when said heater is energized, and a timer operatively associated with said heater to energize the same after a lapse of a selected time period of said timer.

2. A diverter valve construction as set forth in claim 1 wherein the rod of said rod and tube arrangement engages said valve member.

3. A diverter valve construction as set forth in claim 2 wherein said valve seats are disposed in aligned spaced relation with said valve member disposed for movement therebetween.

4. A diverter valve construction as set forth in claim 3 wherein said rod projects through one of said valve seats to engage said valve member.

5. A diverter valve construction as set forth in claim 4 wherein biasing means is carried by said housing and engages said valve member to tend to push said valve member against said rod.

* * * * *